United States Patent [19]

Isenberg

[11] 4,431,715
[45] Feb. 14, 1984

[54] ELECTRICAL CONTACT STRUCTURES FOR SOLID OXIDE ELECTROLYTE FUEL CELL

[75] Inventor: Arnold O. Isenberg, Forest Hills, Pa.

[73] Assignee: Westinghouse Electric Corp., Pittsburgh, Pa.

[21] Appl. No.: 361,286

[22] Filed: Mar. 24, 1982

[51] Int. Cl.$^3$ .............................................. H01M 8/10
[52] U.S. Cl. ......................................... 429/30; 429/31
[58] Field of Search .................................... 429/30, 31

[56] References Cited

U.S. PATENT DOCUMENTS 3,668,010  6/1972  Fally et al. ............................ 429/31

Primary Examiner—Anthony Skapars
Attorney, Agent, or Firm—W. G. Sutcliff

[57] ABSTRACT

An improved electrical output connection means is provided for a high temperature solid oxide electrolyte type fuel cell generator. The electrical connection of the fuel cell electrodes to the electrical output bus, which is brought through the generator housing to be connected to an electrical load line maintains a highly uniform temperature distribution. The electrical connection means includes an electrode bus which is spaced parallel to the output bus with a plurality of symmetrically spaced transversely extending conductors extending between the electrode bus and the output bus, with thermal insulation means provided about the transverse conductors between the spaced apart buses. Single or plural stages of the insulated transversely extending conductors can be provided within the high temperatures regions of the fuel cell generator to provide highly homogeneous temperature distribution over the contacting surfaces.

7 Claims, 2 Drawing Figures

ELECTRICAL CONTACT STRUCTURES FOR SOLID OXIDE ELECTROLYTE FUEL CELL

BACKGROUND OF THE INVENTION

This invention relates to fuel cell structures and more particularly to improved electrical bus connection structures for bringing electrical power out of a high temperature fuel cell generator. The invention is more particularly directed to high temperature solid electrolyte fuel cells which utilize an electrochemical combustion reaction between an oxidant and a fuel gas, which are combined at the fuel electrode to directly convert chemical energy of the fuel into direct current electrical energy. A typical such fuel cell reacts hydrogen with oxygen or air to produce electrical energy, water vapor and heat.

Solid oxide electrolyte fuel cells operate at elevated temperatures of from about 700° C. to about 1100° C. in order to render the solid oxide electrolyte sufficiently conductive to achieve high conversion efficiency. At such high temperature the need for expensive electrode catalysts is eliminated and gaseous fuels such as hydrogen and carbon monoxide are combusted spontaneously at the fuel electrode.

A solid oxide electrolyte fuel cell is described in co-pending application Ser. No. 219,204, filed Aug. 28, 1981, entitled "High Temperature Solid Electrolyte Fuel Cell Configurations and Interconnections", which can be referred to for further details regarding the fuel cell. This co-pending application describes a fuel cell structure with elongated annular cells connected at adjacent cells along the full axial length of the cells. A fuel cell electrical generator utilizing such elongated annular fuel cells is described in co-pending application Ser. No. 219,185, filed Aug. 19, 1981, entitled "Fuel Cell Generator", and providing further details for a generator formed using solid oxide electrolyte fuel cells.

In the fuel cell and fuel cell generator structures set forth in the above-mentioned co-pending applications, the electrical connection or contacting of output buses to the high temperature fuel cell electrodes is carried out in a high temperature zone within the generator with the output buses then being brought through the generator housing for interfacing with an electrical load line at near ambient temperature. The output electrical buses must be large area, high-conductivity conductors, which means that they are also excellent thermal heat sinks which conduct heat away from the fuel cell members with which they are in physical contact. The thermal conduction away from the fuel cell structures through the bus conductors can result in non-uniform fuel cell cooling at the points of contact between the bus bars and the fuel cell structures. In addition, cold spots can occur in regions near the bus bars where radiation cooling would lead to unacceptable temperature gradients in the fuel cell array of the generator. These temperature gradients can cause physical distortion and, in the worst case, cracking of the elongated tubular fuel cell elements which would permit mixing of the fuel gas and oxidant at an area other than the solid electrolyte. The fuel and oxidant must be maintained separated across the electrolyte barrier to avoid wasteful combustion. This means fuel or oxidant is introduced within the tubular cell with the other reactant supplied about the exterior of the tube. Non-uniform temperature distribution within the fuel cell assembly threatens the mechanical integrity of the fuel cell assembly as well as interfering with good electrical contact along the length of the fuel cell assemblies.

In general, high temperature electrochemical devices require efficient electrical connection means which do present inherent heat loss paths from the devices, but in such electrochemical device's failure to reduce the heat loss or control the uniformity of heat flux distribution does not threaten operability of the device. In the high temperature, solid oxide electrolyte fuel cells with which the electrical contact structure of the present invention find application, continued reliable operation of the cells is dependent on limiting heat flux losses and providing a highly uniform heat flux distribution.

A solid electrolyte fuel cell is described in U.S. Pat. No. 3,668,010 in which annular electrodes are disposed on a solid tube support, with electrode ends overlapping and electrically connected by conductive material. The cells are interconnected in rows by metal strips with the rows being segregated by heat insulating material.

The present invention is directed to providing good electrical conductivity bus bar interconnection to a fuel cell array with minimal thermal losses and avoidance of localized cooling. An improved electrical bus connection means is provided for improved structural stability for the fuel cell tubular array and for the interconnection between the fuel cell and the output buses.

SUMMARY OF THE INVENTION

An improved electrical generator of the solid oxide electrolyte fuel cell type is provided wherein electrical connection of the electrical output buses to the respective fuel cell elements comprises an electrically conductive means disposed between the fuel cell elements and a large area electrode bus providing intimate electrical contact between the fuel cell elements and the electrode bus. A plurality of symmetrically spaced apart electrically conductive members extend transversely from the large area electrode bus to the output bus which is spaced from the electrode bus. The transversely extending conductive members are electrically connected at opposed ends to a respective electrode bus and the output bus to provide a multiplicity of parallel electrical current paths between the electrode bus and the output bus. Thermal insulation means is disposed about the transversely extending conductive members filling the space between the electrode bus and the output bus. The transversely extending conductive members have a cross-sectional area which limits the thermal transfer from the electrode bus to the output bus which in combination with the thermal insulation means results in a relative homogeneity of the output electrode bus temperature over the entire bus contact area.

DESCRIPTION OF THE PREFERRED EMBODIMENTS

Figure 1:
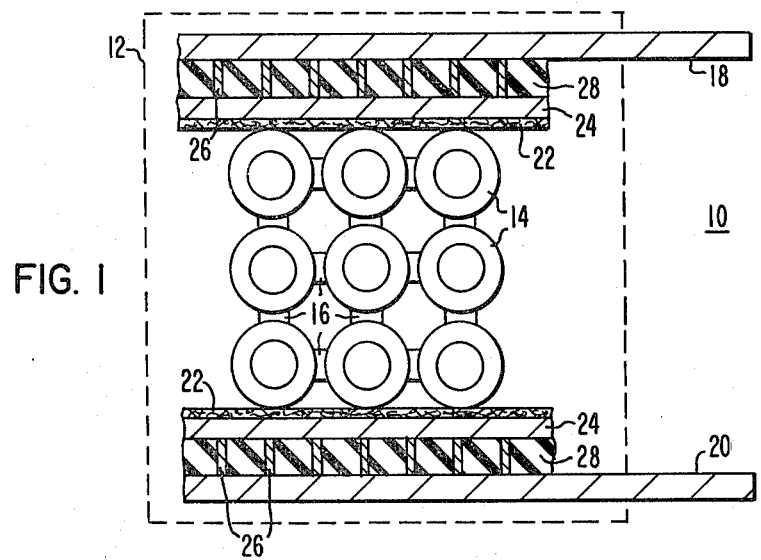
FIG. 1 is a schematic sectional representation of a fuel cell generator of the present invention.

The fuel cell generator 10 seen in FIG. 1 is an electrical generator of solid oxide electrolyte fuel cell type. A generator housing 12 is provided about an array of elongated tubular fuel cell elements 14 which are elongated tubular members arranged in a matrix of rows and columns. In the representation of FIG. 1 three rows and three columns of tubular fuel cells are illustrated by way of example. The actual numbers of fuel cells and the extent of the matrix array is a matter of choice to produce the desired electrical power and voltage characteristic desired from the generator.

The detailed structure of the tubular fuel cell elements 14 can be had from the above-mentioned copending application Ser. No. 219,204. The elongated tubular fuel cell elements 14 in general comprise an inner tubular support body of calcia-stabilized zirconia with a porous electrode annularly disposed on this support body. A solid oxide electrolyte material, such as yttria-stabilized zirconia, is deposited about the inner electrode, and an outer porous electrode is provided about the solid electrolyte. The outer electrode does not extend fully about the perimeter of the tubular body, but is interrupted to permit electrical interconnections, as generally illustrated in FIG. 1 by the interconnect pads 16 of metallic felt material, which interconnects an inner electrode of one tubular fuel cell to the outer electrode of another for a series interconnection. The metallic felt pads 16 also provide parallel interconnection between the outer electrode of adjacent fuel cells. The fuel cell array generates an electrical potential across the inner and outer electrodes as a result of electrochemical combustion occurring at the solid oxide electrolyte between oxidant and gaseous fuel cell which are introduced on opposed sides of the solid electrolyte.

A pair of electrode buses 18 and 20 extend from opposed sides of the fuel cell array and are insulated through the generator housing 12 to permit electrical connection to electrical load lines exterior to the generator housing. These electrode output buses 18 and 20 are high conductivity materials which preferably are high strength metallic conductors which provide intimate electrical contact between the fuel cell tubes via conductive pads 16. A large area electrically conductive felt pad 22 is disposed in intimate electrical contact with the exterior electrodes of the top row of the fuel cell elements seen in FIG. 1. This felt pad 22 is made of the same type of material as pads 16, and is typically nickel fibers which are highly conductive yet physically resilient even when sinter bonded to the electrodes of the cells during high temperature operation. The large area conductive felt pad 22 is in intimate electrical contact with a large area electrode bus 24 which is here shown as a bus plate co-extensive in area with the large area felt pad 22. A plurality of symmetrically spaced apart electrically conductive members 26 extend transversely from the large area electrode bus 24 to the output bus 18 spaced from the electrode bus 24. The transversely extending conductive members 26 are electrically connected at opposed ends to the electrode bus and the output bus providing a multiplicity of parallel electrical current pads between the electrode bus 24 and the output bus 18. Thermal insulation means 28 is disposed about the tranversely extending conductive members 26 filling the space between the electrode bus and the output bus. The thermal insulation means 28 may comprise high temperature resistant insulating foam or fibrous ceramic.

In the same way the opposed output bus 20 is connected to the opposed side of the fuel cell array via the felt pad and electrode bus, electrical connection means and the transverse conductive members extending between the electrode bus and the output bus with thermal insulation means provided between the electrode bus and the output bus.

The output buses 18 and 20 as well as the electrode bus 24 and members 26 are typically high temperature conductive material such as nickel and nickel alloys, but are selected to have optimum electrical conductivity at the operating temperature of the fuel cell assembly. These conductive bus materials are selected to have optimum electrical conductivity and to have the needed structural strength at the high operating temperature of the cell. The transversely extending conductive members between the electrode buses and the output buses may be rod-like or simple wire conductors with a number of conductors and conductor cross-sectional areas consistent with the design power for the fuel cell generator.

Figure 2:
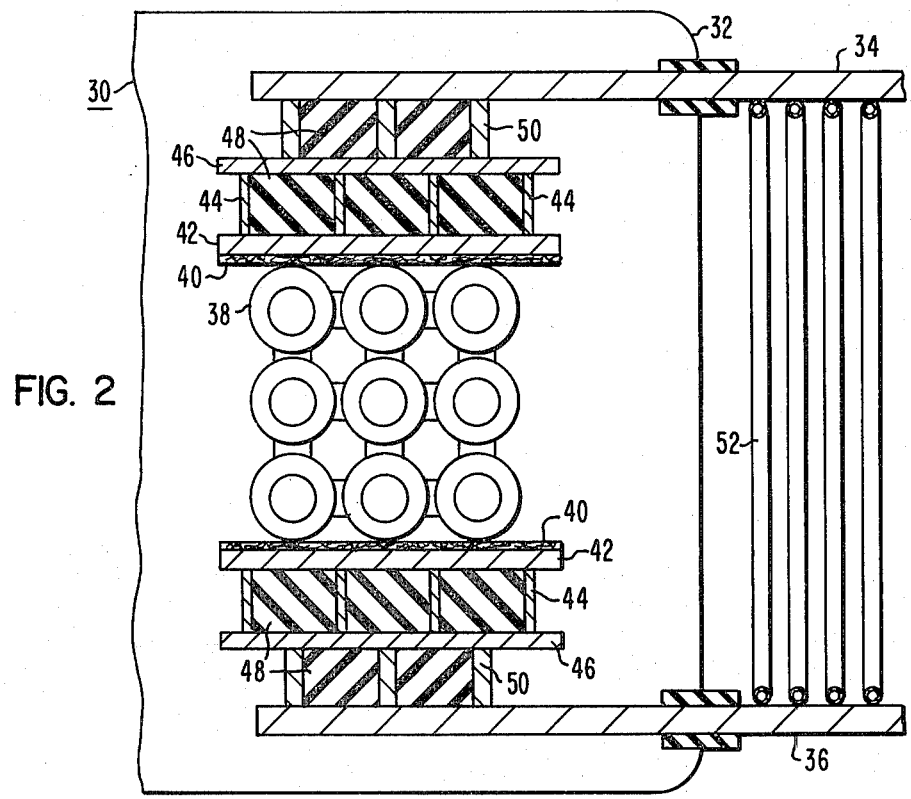
FIG. 2 is also a schematic sectional representation of another embodiment fuel cell generator of the present invention in which plural-stage electrical buses and transversely extending conductors are provided for reducing the temperature gradients in stages.

In another embodiment of the invention as seen in FIG. 2, the fuel cell generator 30 includes a housing 32 through which a pair of output buses 34 and 36 are insulatingly fed through to permit electrical interconnection with external load lines. Again, in this embodiment three rows and columns of fuel cell elements 38 are arranged in a matrix array. In order to provide a more homogeneous temperature condition from the output buses to the fuel cell elements a plural stage electrical interconnection is seen. A conductive felt pad 40 is disposed in intimate electrical contact with the electrodes of the top row of fuel cell elements and a large area planar electrode bus 42 is disposed in intimate electrical contact with the felt pad 40. A plurality of transversely extending electrical conductors 44 extends between the electrode bus 42 and a second electrode bus 46. The transverse conductors are symmetrically spaced apart and thermal insulation means 48 is provided about the conductors 44 filling the volume between the electrode bus 42 and second bus 46. This structure provides a first stage temperature reduction or insulation capability between the fuel cells and the outer output bus, but a second stage is also provided by a second level of transversely extending conductors 50 which are also symmetrically spaced apart but are lesser in number than the first stage transverse conductors 44 with the second stage transverse conductors 50 having a correspondingly greater conductor thickness or volume than the first stage transverse conductors 44. Thermal insulation means 48 is also provided about the second stage transverse conductors and fills the volume between the second bus 46 and the output bus 34. The thermal insulation means 48 can generally be provided about the output bus and the fuel cell array generally filling the volume defined by the generator housing 32. The thermal insulation means utilized in the present invention is typically a high temperature resistant insulating foam or fibrous ceramic material.

In the embodiment seen in FIG. 2, the output bus conductors 34 and 36 have fluid cooling means 52 associated therewith. The fluid cooling means 52 can simply comprise sinuously configured tubing or pipe connected to a large area side of the output bar, and adapted to have cooling fluid such as water or air passed through as the cooling medium.

In the embodiments seen in the drawings only two output buses are shown with the numerous rows and columns of fuel cell elements connected in either parallel or series to provide the desired dc power output. In other fuel cell generator embodiments a plurality of output buses may be employed to provide different voltage and power outputs with an output bus connected to one or more rows or columns of cells. The electrical connection structure of the present invention would then be used with each of the plurality of output buses in connecting these output buses to fuel cell elements.

In still other embodiments, one of the electrical output buses may be electrically connected to the generator housing which would then serve as an output connection, with modular generators assembled together in series to provide the desired electrical output characteristics.

I claim:

1. In an electrical generator of the solid oxide electrolyte fuel cell type wherein a plurality of elongated tubular fuel cell elements are arranged in a matrix of rows and columns within a housing, which fuel cell elements include annular elongated inner and outer electrodes which are insulated from an electrolyte layer sandwiched between the electrodes, with electrical interconnections made between adjacent fuel cell elements of the matrix, which interconnections extend along the elongated tubular length of the fuel cell elements, and wherein gaseous reaction species are introduced at the inner and outer electrodes on opposed sides of the electrolyte for reaction at the electrolyte, and wherein at least two electrical output buses are connected to opposed perimeter rows of the fuel cell elements and extend through the housing for connection to an electrical load line, the improvement wherein the electrical connection of the electrical output buses to the respective row of fuel cell elements comprises:

(a) high conductivity means in intimate electrical contact with the outer electrodes of a respective perimeter row of fuel cell elements and which high conductivity means is spaced apart from a respective output bus;

(b) a plurality of symmetrically spaced apart electrically conductive members extending transversely from the high conductivity means to the output bus which transversely extending conductive members are electrically connected at opposed ends to the high conductivity means and the output bus to provide a multiplicity of parallel current paths between the high conductivity means and the output bus;

(c) thermal insulation means disposed about the transversely extending conductive members between the high conductivity means and output bus.

2. The electrical generator set forth in claim 1, wherein the high conductivity means comprises an electrically conductive felt pad one side of which is in intimate electrical contact with the outer electrodes of the respective perimeter row of fuel cell elements, and the other side of the conductive felt pad is in intimate electrical contact with an electrode bus.

3. The electrical generator set forth in claim 2, wherein the electrode bus is a generally planar, rigid, high temperature resistant metal member.

4. The electrical generator set forth in claim 1, wherein the transversely extending conductive members are high temperature resistant metal members having cross-sectional areas which limit the thermal transfer from the high conductivity means to the output bus.

5. The electrical generator set forth in claim 1, wherein the thermal insulation means in high temperature resistant insulating foam or fibrous ceramic.

6. The electrical generator set forth in claim 1, wherein plural stages of transversely extending conductors are provided between the high conductivity means and the output bus with an intermediate bus disposed between successive stages of transversely extending conductors, and wherein the number of such transversely extending conductors is reduced for successive stages farther from the electrode bus, with the cross-sectional area of such successive stage conductors being increased.

7. The electrical generator set forth in claim 1, wherein the output electrical bus is fluid cooled.

* * * * *